(12) United States Patent
Mai et al.

(10) Patent No.: US 11,165,070 B2
(45) Date of Patent: Nov. 2, 2021

(54) METHOD OF PRODUCING A METALLIC INTERCONNECTOR FOR A FUEL CELL STACK AND A METALLIC INTERCONNECTOR PRODUCED BY THE METHOD

(71) Applicant: Hexis AG, Winterthur (CH)

(72) Inventors: Andreas Mai, Kontanz (DE); Roland Denzler, Weisslingen (CH); Fleischhauer Felix, Zürich (CH)

(73) Assignee: HEXIS AG, Winterthur (CH)

( * ) Notice: Subject to any disclaimer, the term of this patent is extended or adjusted under 35 U.S.C. 154(b) by 182 days.

(21) Appl. No.: 15/910,049

(22) Filed: Mar. 2, 2018

(65) Prior Publication Data

US 2018/0269495 A1    Sep. 20, 2018

(30) Foreign Application Priority Data

Mar. 16, 2017  (EP) .................................. 17161348

(51) Int. Cl.
*H01M 8/026* (2016.01)
*B21D 13/10* (2006.01)
(Continued)

(52) U.S. Cl.
CPC ............ *H01M 8/026* (2013.01); *B21D 13/10* (2013.01); *H01M 8/021* (2013.01);
(Continued)

(58) Field of Classification Search
CPC ...... H01M 8/02; H01M 8/026; H01M 8/0208; B21D 13/10
See application file for complete search history.

(56) References Cited

U.S. PATENT DOCUMENTS

2004/0247983 A1* 12/2004 Orishima ............ H01M 8/0206
429/439
2015/0180061 A1* 6/2015 Wuillemin ........ H01M 8/04089
429/434

FOREIGN PATENT DOCUMENTS

DE          10126723 A      12/2002
DE       102010035254 A1    3/2012
(Continued)

OTHER PUBLICATIONS

Extended European Search Report dated May 25, 2017 in corresponding European Patent Application No. 17161348.2, filed Mar. 16, 2017.

*Primary Examiner* — Karie O'Neill Apicella
(74) *Attorney, Agent, or Firm* — Global IP Counselors, LLP

(57) ABSTRACT

A method for producing a metallic interconnector for a fuel cell stack, including an air guiding surface with a first gas distributor structure and a fuel gas guiding surface with a second gas distributor structure, the first gas distributor structure and the second gas distributor structure each formed by grooves and webs, includes providing a sheet metal blank, forming the sheet metal blank by a plastic molding process, the first gas distributor structure and the second gas distributor structure being formed in such a manner that the grooves and webs of the first gas distributor structure are arranged complementary to the grooves and webs of the second gas distributor structure at a predeterminable percentage of area of the air guiding surface and the fuel gas guiding surface of at least 50% and at most 99%.

18 Claims, 4 Drawing Sheets

(51) Int. Cl.
  *H01M 8/0208*    (2016.01)
  *H01M 8/0206*    (2016.01)
  *H01M 8/021*     (2016.01)
  *H01M 8/0254*    (2016.01)
  *H01M 8/0258*    (2016.01)
  *H01M 8/124*    (2016.01)

(52) U.S. Cl.
  CPC ....... *H01M 8/0206* (2013.01); *H01M 8/0208* (2013.01); *H01M 8/0254* (2013.01); *H01M 8/0258* (2013.01); *H01M 2008/1293* (2013.01)

(56) References Cited

FOREIGN PATENT DOCUMENTS

| EP | 1075033 | B1 | 9/2002 |
|----|---------|----|--------|
| EP | 1268868 | B1 | 7/2004 |
| EP | 1445814 | A1 | 8/2004 |
| EP | 1887643 | A1 | 2/2008 |
| EP | 1986259 | A1 | 10/2008 |
| EP | 1278258 | B1 | 4/2010 |

\* cited by examiner

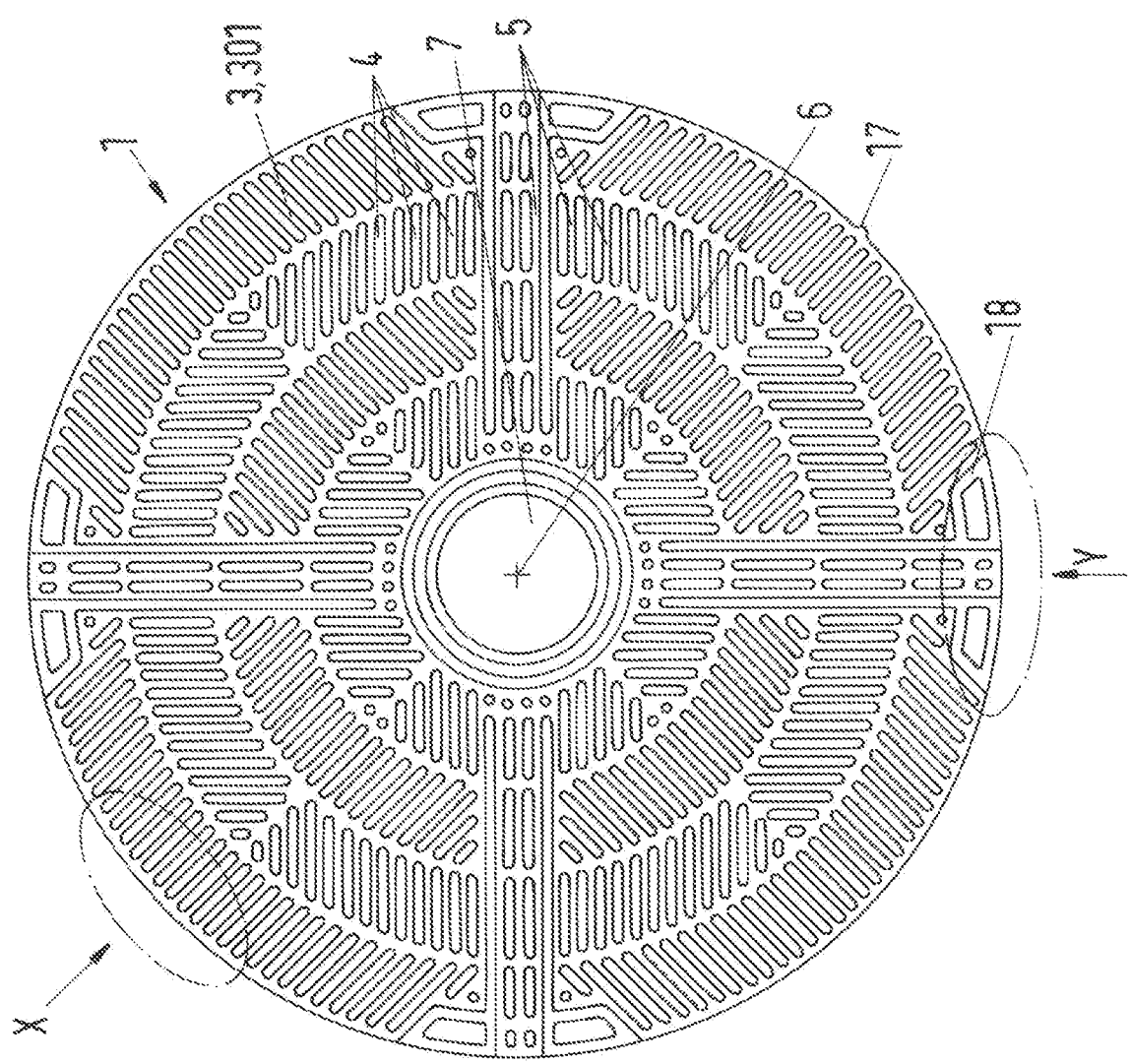

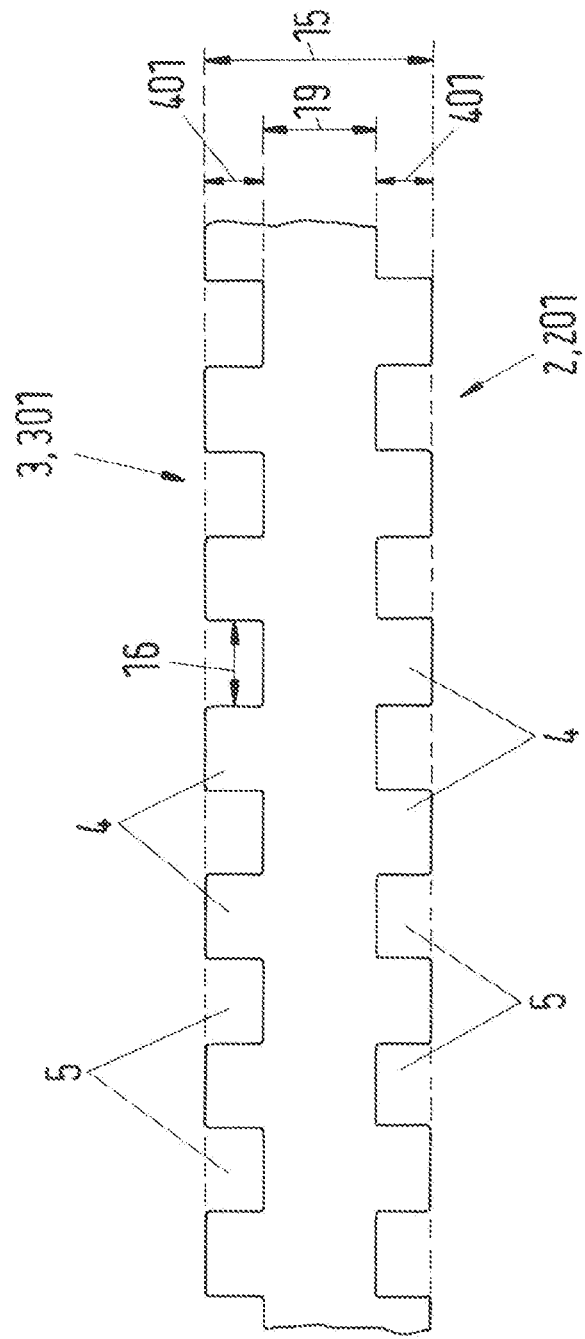

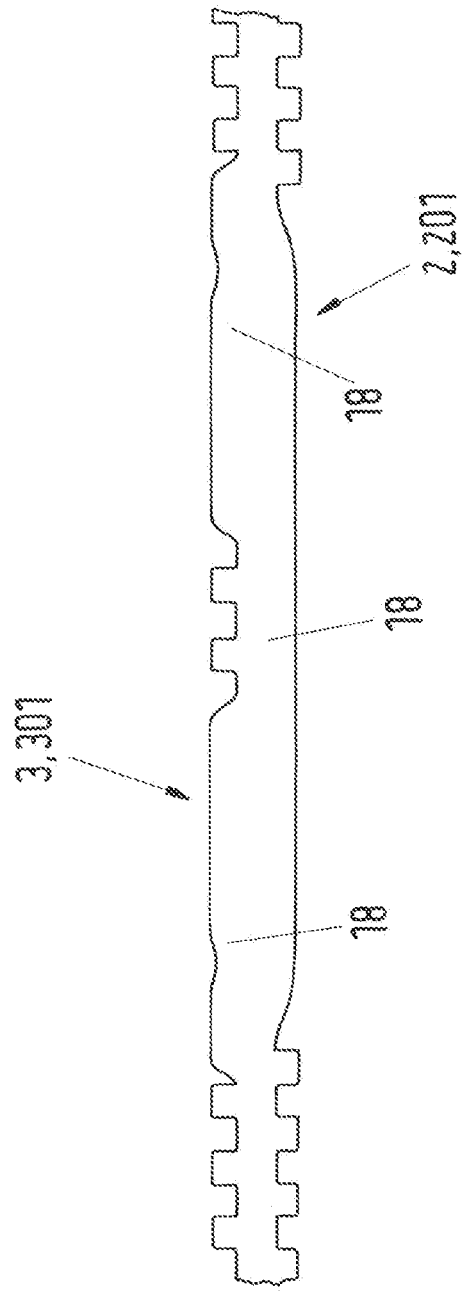

METHOD OF PRODUCING A METALLIC INTERCONNECTOR FOR A FUEL CELL STACK AND A METALLIC INTERCONNECTOR PRODUCED BY THE METHOD

CROSS-REFERENCE TO RELATED APPLICATION

This application claims priority to European Application No. 17161348.2, filed Mar. 16, 2017, the contents of which are hereby incorporated herein by reference.

BACKGROUND

Field of the Invention

The invention relates to a method for producing a metallic interconnector for a fuel cell stack. In addition, the invention relates to a metallic interconnector, which can be produced by the method. Finally, the invention relates to a fuel cell stack with a metallic interconnector, which can be produced by the method.

BACKGROUND OF THE INVENTION

Metallic interconnectors are an important component of high-temperature fuel cell stacks. The functions of the interconnectors are the electrical contact of the fuel cell and the supply of reaction gases. For supplying the reaction gases, the interconnectors have an air guiding surface with a first gas distributor structure and a fuel gas guiding surface with a second gas distributor structure. The cathode of the fuel cell is supplied with air via the first gas distributor structure and the anode of the fuel cell is supplied with fuel gases via the second gas distributor structure.

SUMMARY

In current high-temperature fuel cell stacks interconnectors are predominantly used, which are produced based on sheet metal forming or powder metallurgical processes:
1.) Production by sheet metal forming: here, planar metal sheets, usually metal sheets of ferritic chromium steels, are formed. Interconnectors produced in this way, which emerge, for example, from EP 1 278 258 B1, have the shape of a corrugated sheet metal. In other words, the first gas distributor structure and the second gas distributor structure each have mountains and valleys, which are arranged complementary to each other. An essential advantage of the interconnectors produced by sheet metal forming is their simple and cost-effective production. However, an essential disadvantage of interconnectors produced in this way is that they have a shorter service life due to its relatively small thickness (<1.5 mm), specified by the sheet metal forming process. Furthermore, no sealing surfaces can be generated on the interconnectors via the sheet metal forming, since it is necessary to deviate from a corrugated sheet metal structure for such surfaces. Thus, the sealing surfaces must be attached to the air guiding surface and the fuel gas guiding surface in a further process step, for example by welding.
2.) Production by chipping processes: here, thicker metal sheets can be used as the starting material, since the first gas distributor structure and the second gas distributor structure are introduced into the air guiding surface or the fuel gas guiding surface, for example by milling. Such an interconnector emerges, for example, from DE 101 26 723 A1. Interconnectors produced in this way have a high mechanical stability and corrosion resistance due to their thickness (>1.5 mm) and thus, a longer service life. The interconnectors can also be easily provided with sealing surfaces by this production process. However, the production of these mechanically processed interconnectors is time-consuming and the material utilization is reduced by the material removal. As a result, this type of interconnector is comparatively expensive to produce
3.) Production by powder metallurgy processes: alternatively, interconnectors are known which are produced by means of powder metallurgical processes. Such interconnectors, which emerge, for example, from EP 1 075 033 B1 and EP 1 268 868 B1, have a high mechanical stability and corrosion resistance, among other things, due to their thickness (>1.5 mm) and have thus proved to be advantageous for use in a high-temperature fuel cell. Also, in this production process, the interconnectors can be easily provided with sealing surfaces. However, interconnectors produced by powder metallurgy processes are also expensive.

Since the interconnectors are responsible for a substantial portion of the cost of the fuel cell heater, enormous efforts are made to reduce the production costs of the interconnectors and thus the production costs of the fuel cell stacks.

Therefore, it is an object of the invention to propose a simple and inexpensive method for producing a metallic interconnector and a metallic interconnector or fuel cell stack produced by a simple and inexpensive method, in which a sheet metal blank is used as the starting material, sealing surfaces are easy to produce, and the metallic interconnector produced by the method has a long service life.

According to the invention, the problem is met by a method for producing a metallic interconnector, by a metallic interconnector and by a fuel cell stack, as described herein.

Thus, the invention relates to a method for producing a metallic interconnector for a fuel cell stack, which has an air guiding surface with a first gas distributor structure and a fuel gas guiding surface with a second gas distributor structure. The first gas distributor structure and the second gas distributor structure are each formed by grooves and webs and the method comprises the following steps:
  providing a sheet metal blank,
  forming the sheet metal blank by a plastic molding process, wherein the first gas distributor structure and the second gas distributor structure are formed in such a manner, that the grooves and webs of the first gas distributor structure are arranged complementary to the grooves and webs of the second gas distributor structure at a predeterminable percentage of area of the air guiding surface and the fuel guiding surface of at least 50% and at most 99%.

Within the framework of this invention, a plastic molding process can be understood, for example, as the following molding processes: massive embossing, pressure forming according to DIN 8583, in particular tensile-compressive forming according to DIN 8584, uniaxial pressing, orbital pressing, or another suitable pressing method, also in combination with a subsequent calibrating pressing.

The thickness of the sheet metal blank is increased in some areas as a result of material migration and reduced in other areas during the plastic forming process. In other words, the interconnector produced by the plastic forming process has both areas in which the thickness of the interconnector is greater than the thickness of the sheet metal blank and areas in which the thickness of the interconnector is smaller than the thickness of the sheet metal blank. This in contrast to the state of the art where during sheet metal forming the thickness of the sheet metal blank is continuously reduced, i.e. the interconnector produced by sheet metal forming has a thickness that is consistently smaller than the thickness of the sheet metal blank.

Furthermore, within the framework of this invention, the first gas distributor structure and the second gas distributor structure are formed in such a manner, that the grooves and webs of the first gas distributor structure are arranged complementary to the grooves and webs of the second gas distributor structure at a predeterminable percentage of area of the air guiding surface and the fuel guiding surface of at least 50% and at most 99%. The term "complementary" means, that a web of the first gas distributor structure and a groove of the second gas distributor structure or a groove of the first gas distributor structure and a web of the second gas distributor structure lie in a common plane extending perpendicular to the air guiding surface or the fuel gas guiding surface.

In other words, within the framework of the invention, the first gas distributor structure and the second gas distributor structure are formed in such a manner at a percentage of area of the air guiding surface and the fuel guiding surface of at least 1%, that the grooves and webs of the first gas distributor structure are not arranged complementary to the grooves and webs of the second gas distributor structure. This in contrast to the state of the art, where the grooves and webs of the first gas distributor structure are arranged completely complementary to the grooves and webs of the second gas distributor structure by means of sheet metal forming.

Furthermore, within the framework of the invention, the term "web" means an elongated, continuous or interrupted elevation in the running direction. The "web" can also be formed in the shape of a circle as a dome or nob. In addition, within the framework of the invention, the sheet metal blank may be formed round, e.g. as a circular disk or angular, for example as a rectangular plate.

An essential advantage of the method according to the invention is, that sheet metal blanks with an increased thickness (>1.5 mm) can be easily processed into interconnectors. Thus, interconnectors can be produced at a reasonable price, which have a long service life. The production of the interconnectors can be achieved by means of conventional pressing forces, such as those used in sheet metal forming. Thus, the interconnectors can be produced with conventional tools, i.e. without using special tools. A further advantage of the method according to the invention is, that sealing surfaces can be formed directly on the interconnectors in the course of the forming process.

In a very important embodiment for practical use, the percentage of area of the air guiding surface and the fuel guiding surface, in which the grooves and webs of the first gas distributor structure and the grooves and webs of the second gas distributor structure are formed complementary, is 55 to 98%, preferred 65 to 95%, particularly preferred 75 to 90%. This makes it possible to form localized overlaps for sealing surfaces in an optimal way.

It has also proved to be advantageous if the interconnector is formed as an annular disk with a disk axis and an opening concentric with the disk axis. In this case, the second gas distributor structure has a first annular surface concentric with the disk axis and a second annular surface concentric with the disk axis, wherein the first annular surface and the second annular surface are separated by a ring groove. Furthermore, the second gas distributor structure has at least one direction radial to the disk axis, wherein the first annular surface and the second annular surface each have at least one first radial web extending along the radial direction. The first annular surface and the second annular surface each can also have at least one first radial groove extending along the radial direction. Due to the design of the interconnector as an annular disk, it is possible to provide the interconnector with short sealing surfaces. In addition, an improved flow of the fuel gas is achieved at the fuel gas guiding surface by means of the first radial web or the first radial groove. The fuel gas can also be guided directly behind the sealing surfaces by the first radial web or the first radial groove, which has a positive effect on a homogeneous fuel gas supply.

Furthermore, it is advantageous if the first annular surface and the second annular surface each have at least one second radial web extending parallel to the first radial web. The first annular surface and the second annular surface each may also have at least a second radial groove extending parallel to the first radial groove. The flow of the fuel gas can be further improved at the fuel gas guiding surface by means of the second radial web or the second radial groove.

In practice, it has also proved to be advantageous, if the sheet metal blank is made of a ferritic steel with the material number 1.4760, in particular of a ferritic steel with the material number 1.4509 or of a ferritic steel with 8%≤chromium ≤40%, in particular 22% chromium, 0.05%≤manganese ≤20%, and 40%≤iron ≤91.95%. Due to these materials, a reduced formation of chromium oxide is achieved at the air guiding surface and the fuel gas guiding surface, which results in a reduced contamination of the individual cells, in particular of the cathodes. Thus, the service life of the interconnector can be extended.

Furthermore, it is advantageous if the outer diameter of the sheet metal blank is 50 to 250 mm, in particular 70 to 200 mm, 90 to 140 mm, particularly preferred 120 mm. This has a positive effect on the size of the installation space, which is needed for the fuel cell stack.

In another very important embodiment for practical use, the thickness of the sheet metal blank is 0.5 to 3.5 mm, in particular 1.5 to 2.5 mm. This has a positive effect on the service life of the interconnector.

It is also advantageous if the width of the grooves is 0.5 to 2 mm, in particular 1 mm.

In practice, it has proved to be advantageous, if a multilayer sheet metal blank is used as sheet metal blank. For example, the sheet metal blank can be composed of layers of different material. Thus, the sheet metal blank may have a first and a second layer, which are made of the same material and in each of which the first and the second gas distributor structure are introduced. Furthermore, the sheet metal blank may have another layer of a different material, which separates the first and the second layer.

It is also advantageous if the sheet-metal blank has an orientation element at its circumference in the form of an elevation, which preferably extends perpendicular to a circumferential line of the sheet metal blank. Due to the orientation element, the orientation of the interconnector in the pressing tool can be easily determined. The orientation element may already be a component of the sheet metal blank or may be introduced into the sheet metal blank during the forming process.

The present invention further relates to a metallic interconnector for a fuel cell stack, wherein the interconnector is made of a sheet metal blank according to a method according to anyone of the claims 1 to 13. The interconnector has an air guiding surface with a first gas distributor structure and a fuel gas guiding surface with a second gas distributor structure, wherein the first gas distributor structure and the second gas distributor structure are each formed by grooves and webs and the grooves and webs of the first gas distributor structure are arranged complementary to the grooves and webs of the second gas distributor structure at a predeterminable percentage of area of the air guiding surface and the fuel gas guiding surface of at least 50% and at most 99%.

BRIEF DESCRIPTION OF THE DRAWINGS

The invention will be explained in more detail hereinafter with reference to the drawings.

FIG. 2 is an air guiding surface of the interconnector according to FIG. 1, FIG. 3 is a partial side view X according to FIG. 1 and FIG. 4 is a partial side view Y according to FIG. 1.

DETAILED DESCRIPTION OF THE EMBODIMENTS

Figure 1:
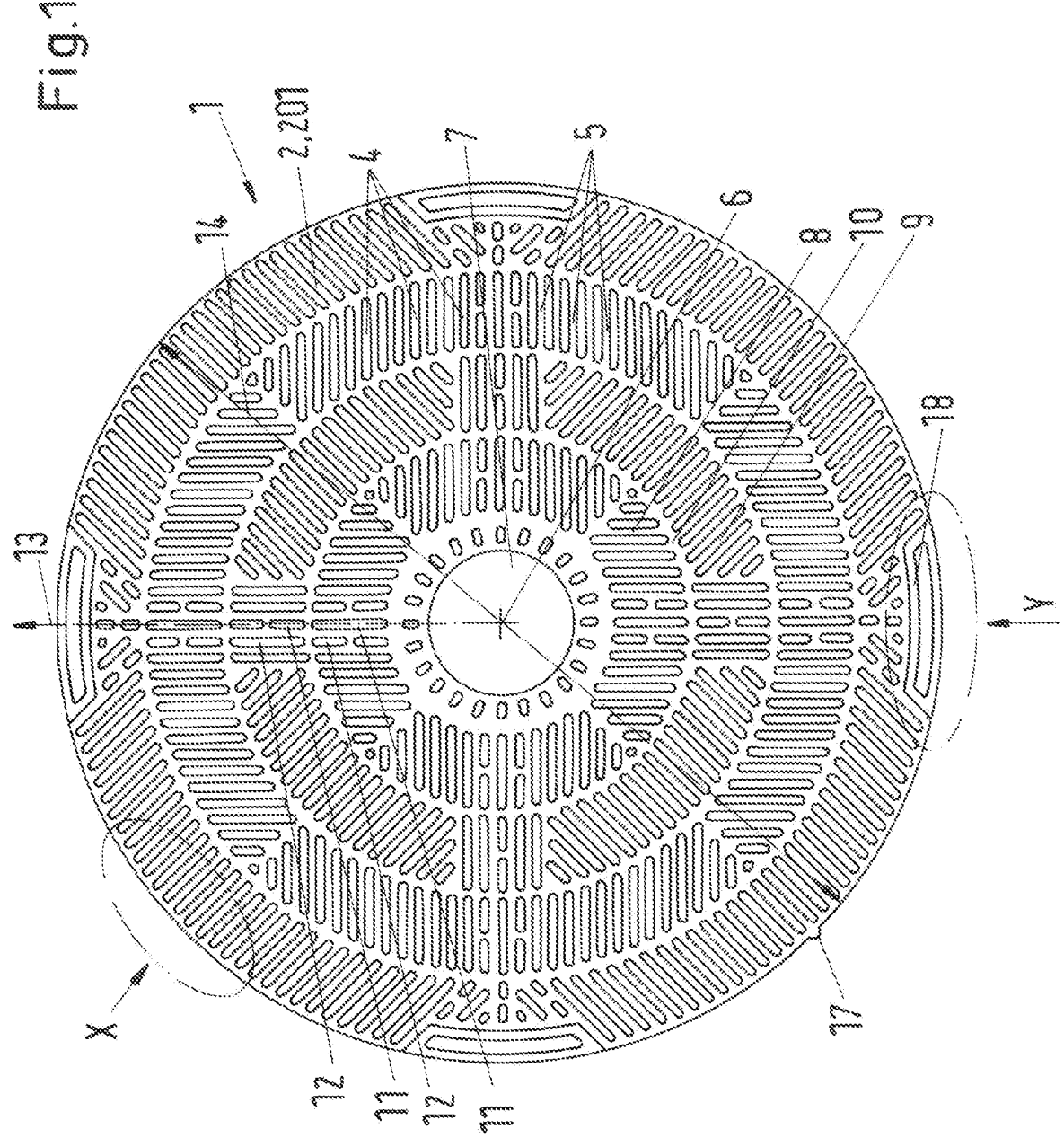
FIG. 1 is a fuel gas guiding surface of an interconnector according to the invention.

FIG. 1 shows a fuel gas guiding surface 2 of an interconnector 1 according to the invention, which is produced by the method according to the invention. The interconnector 1 is formed in the shape of an annular disk with a disk axis 6 and an opening 7 concentric with the disk axis 6. The annular disk has an outer diameter 14 of 120 mm. The fuel gas guiding surface 2 has a first gas distributor structure 201, which is formed by webs 4 and grooves 5. The webs 4 have the shape of elongated elevations and form between them grooves 5. In addition, the first gas distributor structure 201 has a first annular surface 8 and a second annular surface 9, which are each arranged concentrically to the disk axis 6 and which are separated by an annular groove 10. A first radial web 11, which extends in a radial direction 13 of the annular disk, is arranged in each case on the first annular surface 8 and the second annular surface 9. Furthermore, a second radial web 12, which extends parallel to the first radial web 11, is arranged in each case on the first annular surface 8 and the second annular surface 9. In a further, not shown embodiment, analogous to the embodiment shown in FIG. 1, a first radial groove, which extends in the radial direction 13 of the annular disk, is arranged in each case on the first annular surface 8 and the second annular surface 9. In addition, a second radial groove, which extends parallel to the first radial groove, is arranged in each case on the first annular surface 8 and the second annular surface 9.

In addition, the annular disk includes, at its circumference, an orientation element 17 in the form of an elevation. The orientation element 17 supports the positioning or the orientation of the interconnector 1 in the pressing tool. The fuel gas guiding surface 201 also has a sealing element 18.

FIG. 2 shows an air guiding surface 3 of the interconnector 1 according to FIG. 1. The air guiding surface 3 has, analogously to the fuel gas guiding surface 2, a first gas distributor structure 301, which is formed by webs 4 and grooves 5. The webs 4 also have the form of elongated elevations and form grooves 5 between them. The air guiding surface 3 also has a sealing element 18.

FIG. 3 shows a partial side view X according to FIG. 1. On the basis of this view it becomes apparent, that the grooves 5 and webs 4 of the first gas distributor structure 301 are arranged complementary to the grooves 5 and webs 4 of the second gas distributor structure 201 at a predeterminable percentage of area of the air guiding surface 3 and the fuel gas guiding surface 2. In other words, a web 4 of the first gas distributor structure 301 and a groove 5 of the second gas distributor structure 201 or a groove 5 of the first gas distributor structure 301 and a web 4 of the second gas distributor structure 201 lie in a common plane extending perpendicular to the air guiding surface 3 or the fuel gas guiding surface 2.

Furthermore, it is clear from the view, that the webs 4 of the first gas distributor structure 301 have the same web height 401 and the webs 4 of the second gas distributor structure 201 have the same web height 401. The thickness of the interconnector 1 is the sum of the thickness of the core 19 and the web height 401 of the first gas distributor structure 301 and the web height 401 of the second gas distributor structure 201. The width 16 of the grooves 5, i.e. the distance between two adjacent webs 4, is 1 mm.

FIG. 4 shows a partial side view Y according to FIG. 1. In this view, a sealing surface 18 is illustrated, which is arranged both on the air guiding surface 3 and the fuel gas guiding surface 2. In contrast to the complementary arrangement according to FIG. 3, the grooves and webs of the first gas distributor structure 301 are not arranged complementary to the grooves and webs of the second gas distributor structure 201 in the region of the sealing surface 18. On the contrary, webs of the first gas distributor structure 301 and webs of the second gas distributor structure 201 or grooves of the first gas distributor structure 301 and grooves of the second gas distributor structure 201 are opposite each other.

In this embodiment (FIG. 1 to FIG. 4), the percentage of area of the air guiding surface 3 and the fuel gas guiding surface 2, in which the grooves 5 and webs 4 of the first gas distributor structure 301 are arranged complementary to the grooves 5 and webs 4 of the second gas distributor structure 201, is approximately 98%.

Example of Production

A round sheet metal blank made of steel with the material number 1.4760 with an outer diameter of 120 mm and a thickness of 2.5 mm was brought into an embossing press with split embossing dies, which were adjusted to the specific shape of the first gas distributor structure and the second gas distributor structure, for producing a disk-shaped, metallic interconnector comprising an air guiding surface with a first gas distributor structure and a fuel gas guiding surface with a second gas distributor structure.

Then, the sheet metal blank was massively embossed under a pressing power of 1000 kN/cm² at ambient temperature, wherein the first gas distributor structure and the second gas distributor structure are formed in such a manner, that the grooves and webs of the first gas distributor structure were arranged complementary to the grooves and webs of the second gas distributor structure at a percentage of area of the air guiding surface and the fuel gas guiding surface of 98%.

After massive embossing, the ejection of the interconnector from the embossing press took place.

The invention claimed is:

1. A method for producing a metallic interconnector for a fuel cell stack, the metallic interconnector having a core, an air guiding surface with a first gas distributor structure and a fuel gas guiding surface with a second gas distributor structure, the first gas distributor structure and the second gas distributor structure each being formed by grooves and webs, the method comprising:

providing a sheet metal blank; and embossing the sheet metal blank by a plastic molding process, such that the first gas distributor structure and the second gas distributor structure are formed such that some webs of the webs of the first gas distributor structure and some grooves of the grooves of the second gas distributor structure, or some grooves of the grooves of the first gas distributor structure and some webs of the webs the second gas distributor structure lie in a common plane extending perpendicular to the air guiding surface or the fuel gas guiding surface such that the grooves and webs of the first gas distributor structure are arranged complementary to the grooves and webs of the second gas distributor structure at a predeterminable percentage of area of the air guiding surface and the fuel gas guiding surface of at least 55% and at most 98%, such that a thickness of the metallic interconnector is a sum of a thickness of the core and a web height of the first gas distributor and a web height of the second gas distributor structure.

2. The method according to claim 1, wherein the interconnector is formed as an annular disk with a disk axis and an opening concentric with the disk axis and the second gas distributor structure has a first annular surface concentric with the disk axis and a second annular surface concentric with the disk axis, the first annular surface and the second annular surface are separated from each other by an annular groove and the second gas distributor structure has at least one direction radial to the disk axis, and the first annular surface and the second annular surface each have at least one first radial web extending along the radial direction.

3. The method according to claim 2, wherein the first annular surface and the second annular surface each have at least one second radial web extending parallel to the first radial web.

4. The method according to claim 1, wherein the interconnector is formed as an annular disk with a disk axis and an opening concentric with the disk axis and the second gas distributor structure has a first annular surface concentric with the disk axis and a second annular surface concentric with the disk axis, the first annular surface and the second annular surface are separated from each other by an annular groove and the second gas distributor structure has at least one direction radial to the disk axis, and the first annular surface and the second annular surface each have at least one first radial groove extending along the radial direction.

5. The method according to claim 4, wherein the first annular surface and the second annular surface each have at least one second radial groove extending parallel to the first radial groove.

6. The method according to claim 1, wherein the sheet metal blank is made of a ferritic steel with the material number 1.4760 or of a ferritic steel with 8%≤chromium ≤40%, 0.05%≤manganese ≤20%, and 40%≤iron ≤91.95%.

7. The method according to claim 1, wherein the outer diameter of the sheet metal blank is 50 to 250 mm.

8. The method according to claim 1, wherein the thickness of the sheet metal blank is 0.5 to 3.5 mm.

9. The method according to claim 1, wherein the width of the grooves is 0.5 to 2 mm.

10. The method according to claim 1, wherein a multi-layer sheet metal blank is used as the sheet metal blank.

11. The method according to claim 1, wherein the sheet metal blank has an orientation element at a circumference in the form of an elevation, which extends perpendicular to a circumferential line of the sheet metal blank.

12. A metallic interconnector for a fuel cell stack, the interconnector being made from the sheet metal blank according to the method according of claim 1, the interconnector comprising:

the core;

the air guiding surface with the first gas distributor structure; and the fuel gas guiding surface with the second gas distributor structure, the first gas distributor structure and the second gas distributor structure each being formed by the grooves and webs and the grooves and webs of the first gas distributor structure being complementarily arranged to the grooves and webs of the second gas distributor structure at the predeterminable percentage of the area of the air guiding surface and the fuel gas guiding surface of at least 55% and at most 98%, and the thickness of the metallic interconnector being the sum of the thickness of the core and the web height of the first gas distributor and the web height of the second gas distributor structure.

13. A fuel cell stack, comprising:

the metallic interconnector according to claim 12.

14. The method according to claim 1, wherein the percentage of area of the air guiding surface and the fuel gas guiding surface, in which the grooves and webs of the first gas distributor structure and the grooves and webs of the second gas distributor structure are complementarily formed, is 75 to 90%.

15. The method according to claim 14, wherein the sheet metal blank is made of a ferritic steel with the material number 1.4509, or of a ferritic steel with 8%≤chromium ≤22%, 0.05%≤manganese ≤20%, and 40%≤iron ≤91.95%.

16. The method according to claim 14, wherein the outer diameter of the sheet metal blank is 120 mm.

17. The method according to claim 14, wherein the thickness of the sheet metal blank is 1.5 to 2.5 mm.

18. The method according to claim 14, wherein the width of the grooves is 1 mm.

* * * * *